US012786177B2

(12) United States Patent
Goranov et al.

(10) Patent No.: US 12,786,177 B2
(45) Date of Patent: Nov. 3, 2026

(54) METHOD AND A COMPUTER PROGRAM PRODUCT FOR PERFORMING A REMOTE ONLINE AUTHENTICATION PROCESS

(71) Applicant: Ubiqu B.V., Rotterdam (NL)

(72) Inventors: Boris Petrov Dokov Goranov, Rotterdam (NL); Erwin Haasnoot, Rotterdam (NL)

( * ) Notice: Subject to any disclaimer, the term of this patent is extended or adjusted under 35 U.S.C. 154(b) by 301 days.

(21) Appl. No.: 18/242,480

(22) Filed: Sep. 5, 2023

(65) Prior Publication Data

US 2025/0080515 A1 Mar. 6, 2025

(51) Int. Cl.
*H04L 9/40* (2022.01)
*G06F 13/20* (2006.01)

(52) U.S. Cl.
CPC .............. *H04L 63/08* (2013.01); *G06F 13/20* (2013.01)

(58) Field of Classification Search
CPC ...... G06F 13/20; H04L 63/0853; H04L 63/08
See application file for complete search history.

(56) References Cited

U.S. PATENT DOCUMENTS 11,704,939 B2 7/2023 Hamid et al.
2020/0120089 A1* 4/2020 Varanasi ................ H04L 63/10
2021/0110014 A1* 4/2021 Turgeman ........... G06F 11/3419
2023/0114650 A1 4/2023 Keith, Jr.

OTHER PUBLICATIONS

Haasnoot, E. et al., Presentation Attack Detection and Biometric Recognition in a Challenge-Response Formalism, EURASIP Journal on Information Security, Sep. 5, 2022, pp. 1-15.

* cited by examiner

*Primary Examiner* — Benjamin A Kaplan
(74) *Attorney, Agent, or Firm* — Reinhart Boerner Van Deuren s.c.

(57) ABSTRACT

A method for performing a remote online authentication process. The method includes providing an authentication device communicately connected to an interrogating entity, and sending, by the interrogating entity, an I/O request to the authentication device. The method also includes outputting the I/O request on the authentication device, via an I/O interface of the authentication device, and receiving, on the authentication device, an I/O response, via the I/O interface of the authentication device. Further, the method includes verifying whether the received I/O response has been received from a user associated with the authentication device after the I/O request has been output on the authentication device and whether the received I/O response relates to the I/O request.

17 Claims, 1 Drawing Sheet

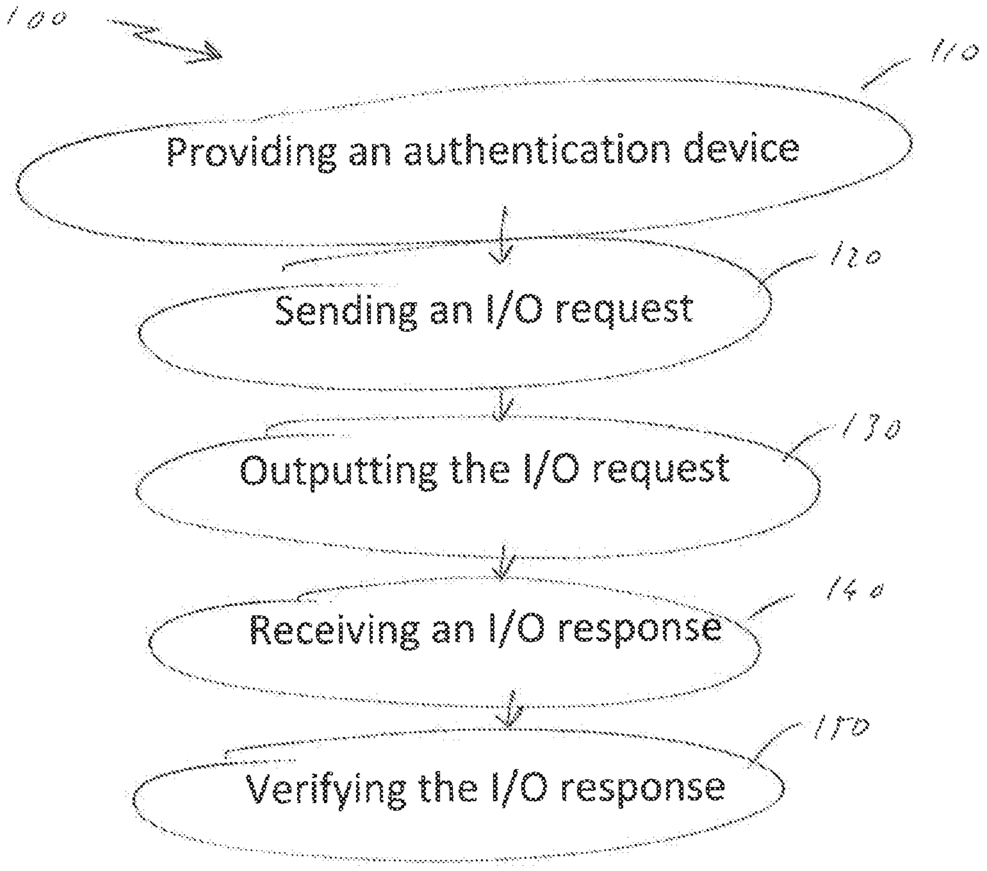
100
Providing an authentication device
110
Sending an I/O request
120
Outputting the I/O request
130
Receiving an I/O response
140
Verifying the I/O response
150

METHOD AND A COMPUTER PROGRAM PRODUCT FOR PERFORMING A REMOTE ONLINE AUTHENTICATION PROCESS

CROSS-REFERENCE TO RELATED APPLICATIONS

Not applicable.

FIELD OF THE INVENTION

The present invention relates to a method for performing a remote online authentication process.

BACKGROUND OF THE INVENTION

For the purpose of secure exchange of information on the Internet, e.g. for enabling reliable access to data, safe information storage, processing and distribution, it is highly relevant that a remote online authentication process is performed reliably and securely.

SUMMARY OF THE INVENTION

It is an object of the invention to provide a method for reliably and securely performing a remote online authentication process. Thereto, according to the invention, a method is provided, comprising the steps of providing an authentication device communicately connected to an interrogating entity, sending, by the interrogating entity, an I/O request to the authentication device, outputting the I/O request on the authentication device, via an I/O interface of the authentication device, receiving, on the authentication device, an I/O response, via the I/O interface of the authentication device, and verifying whether the received I/O response has been received from a user associated with the authentication device after the I/O request has been output on the authentication device and whether the received I/O response relates to the I/O request.

Further, the invention relates to a computer program product. A computer program product may comprise a set of computer executable instructions stored on a data carrier, such as a CD, DVD, app or cloud server. The set of computer executable instructions, which allow a programmable computer to carry out the methods as defined above, may also be available for downloading from a remote server, for example via the Internet or via an app.

Other advantageous embodiments according to the invention are described in the following claims.

BRIEF DESCRIPTION OF THE DRAWINGS

By way of example only, embodiments of the present invention will now be described with reference to the accompanying figures in which FIG. 1 shows a flow chart of a method according to the invention.

It is noted that the figures show merely a preferred embodiment according to the invention. In the figures, the same reference numbers refer to equal or corresponding parts.

DETAILED DESCRIPTION OF THE PREFERRED EMBODIMENT

FIG. 1 shows a flow chart of a method according to the invention. The method is applied for performing a remote online authentication process. The method 100 comprises a step of providing 110 an authentication device communicately connected to an interrogating entity, and a step of sending 120, by the interrogating entity, an I/O request to the authentication device. Further, the method comprises a step of outputting 130 the I/O request on the authentication device, via an I/O interface of the authentication device, and a step of receiving 140, on the authentication device, an I/O response, via the I/O interface of the authentication device. The method also comprises a step of verifying 150 whether the received I/O response has been received from a user associated with the authentication device after the I/O request has been output on the authentication device and whether the received I/O response relates to the I/O request.

Challenge-response in biometrics, Presentation Attack Detection and Biometric Recognition Identity An identity gives a situated sense, a context, to a person.

A person needs to be able to give an answer to the question "Who am I", while others need to be able to confirm "Who you are" in order to interact effectively with each other.

From an identification point of view there are 3 levels of interactions:

Self-declared

ID document verified

Notary

In normal interactions persons know each other and identification is implicit. When persons don't know each other, they self-declare their identity.

If an interaction is more formal, a contract is drafted and signed, depending on jurisdiction with witnesses. The contract then contains the identifying information possibly checked with an id document.

For some interactions, notaries are used. Notaries use identity documents or more traditionally an Affidavit of Identity by Credible Witnesses. For example, the current advice for notaries in Colorado, USA is:

"Identification by a credible witness should only be used when the person needing notarization cannot provide a physical form of identification such as a driver's license, ID card, military ID or passport and is not personally known by the notary."

Many Governments around the world have, for security reasons, made identification documents mandatory. This has as a side effect that identification of persons in their interaction with the government is also facilitated for other uses. Because an id document is registered in a database and has a serial number, it can be precisely traced back to the person the document was issued to.

When a person is identified and a (contractual) relationship is established, a credential can be issued to the person, negating the necessity of performing the identification again. The quality of the issued credential and the ease of the process of checking it determines what risks are introduced with the credential, i.e. what assurance the credential gives.

The process of giving a credential to a user is called issuing. Asserting the identity of a person is called the identification and assigning the credential to the identification event of the person in a database (and a possible contract) is called binding. There is no word for this combined dataset, we shall call this authentity. Verifying the credential is called authentication and ascertaining the authentity based on the authentication we shall call authentification.

To summarize: in the physical world identification of a person is used to establish the identity within a context. The means of identification can be identity documents. For each new identification this process is repeated, unless the person is known to the other or a credential is issued.

Digital Identity

Digital identity and "physical" identity should not differ that much but they do in a subtle way.

With computers something similar happens, but the computer cannot perform the identification because it cannot read the id document. Even if the computer could read the document, matching the document to the person reliably is hard.

Thus, for computers, a user is always issued a credential. Depending on the nature of the relationship of the user with the owner of the computer (or computer application) this establishment of an authenticity in the computer database can have 4 levels of identification:

Self-declared

Recovery enabled

Verified

ID document verified

Often, a person can create an account on a computer and with this self-registered account only have access to public data and his own data. In this case, all person data is self-declared. The person is invited to enter an email-address or phone number in order to enable recovery. Optionally, the email-address or phone number or other data is then verified. Depending on the purpose of the computer application and/or legal requirements, more or less data needs to be supplied and validated.

For some application an in-person identification with identity document verification is required of a person.

Besides the various levels of identification there is also a varying quality of the credentials. In recent years, there has been an explosion of the types and quality of credentials.

The most widely used is a username and password, and for high security a chip and pin.

Additionally, "passwordless" is seen more and more in the mobile space, where a user is sent an email with a time-sensitive link to click to login.

On top of this, we often see second factors added to user name and password login in the form of an SMS or code generating app.

A more recent development is sending a user a push and requiring the user to enter its PIN. If implemented correctly and backed by an HSM, this can be used as a replacement for chip and pin.

The end quality of the authenticity is the result of the quality of the identification and the quality of the credential and the quality of the binding and the organization managing the binding.

If you lose a credential, then a new issuance needs to be performed, or a recovery process can be started either based on a new identification and verification or through use of a fast track issuance reusing on previously verified data.

Thus digital- and physical identities only differ because digital identities always rely on credentials. Where physical identity can fall back on an (implicit) identification instead of the authentication of an authentity using a credential, in cases where the credential is not available, a digital identity cannot. A new (possibly temporary) credential always needs to be issued to resume the use of a computer application.

Credential History

Historically, username passwords were used in computers, mini-computers and mainframes. Banks used magnetic stripe cards with (centrally stored) PINs. Then, with the invention of GSM and RSA cryptography in the '70s, chip and pin became widely available. By the turn of the century, banks and high-security computer systems started to use chip and pin. It became apparent that chip and pin as a credential for daily use was too complex and cumbersome, because one needed a chipcard reader and its associated drivers to be used in a computer. Additionally, the introduction of widespread smartphones and tablets meant that these credentials also should be usable on those devices and traditional card readers and drivers do not work on those.

Authenticity and Stork and Standards

Because the amount of trust one has in an authentity relies on the quality of identification, authentication, the binding and the organization managing it, it becomes hard to compare different implementations of authentities with each other and even harder to rely on an authentity of another organization.

To this end, the EU started the STORK project. STORK introduced the notion of Levels of Assurance (LoA) and defines 4 Levels of Assurance. Where a LoA depends on the quality of the identification, credential, binding and organization. By precisely defining what is expected, each real-world implementation can be compared. ISO 29115 was partly based on the STORK work, which also defines 4 levels of assurance, as does NIST 800-63 for the USA. In Europe, eIDAS regulation 910/2014 was also based on the work performed with STORK and ISO 29115. eIDAS changed the terminology to low, substantial and high assurance, and dropped level 1. This now maps eIDAS low assurance to LoA2 of STORK/ISO/NIST, substantial to Lo3 and high to LoA4. In Europe PSD2 has come into force, setting standards for banks, which now require a minimum level of quality for the credential on top of the identification and binding requirements for their "Know your Customer" (KYC) process. Additionally, eIDAS introduces the distinction between authentication and signing with a credential. Where authentication is performed to authenticate a person and to ascertain his authentity, signing is performed to legally bind a person's intent to a contract.

Legally binding signatures eIDAS makes a distinction between substantial and high. The difference arises when there is a dispute. If a dispute is raised by a person, then a bank, for instance, will have kept logs of all computer interaction by the disputer and will argue that it has to have been the disputer who approved a specific payload. The fundamental problem is that the disputer is not strictly required to generate all the logging information. Because of that, the banks have many (security) controls in place to make it plausible the bank or anyone within the bank hasn't faked the logs, making it plausible that it was the disputer who created all the logging information that resulted in the disputed payload.

eIDAS high merely requires a signature over the payload, where the signature is generated by a credential of sufficient quality, known as a Qualified Signature Creation Device (QSCD). The organization certified against eIDAS high Standards (called a Qualified Trust Service Provider (QTSP) and registered as such with the authorities. A QTSP thus uses a QSCD credential which was issued with sufficient quality, the identification and organization being of sufficient quality and all this independently audited and supervised.

Flexible, Business Driven and Low Cost

Using a modern mobile phone based QSCD by a QTSP organization enables new possibilities.

When a person first digitally interacts, it is now possible to issue a QSCD-level credential by a QTSP-level organization anonymously. Meaning, the user downloads an app, chooses a PIN and starts using the computer application completely anonymous or with a self-declared identity. An authenticity, with a still unknown identity, thus has level of assurance of zero, but when the person returns, although anonymous, it is with complete certainty the same person, the same authenticity.

Now, depending on business and legal requirements the identity can be enriched with validations and enhanced with recovery possibilities. This enables an organization to do business with the person, with an authenticity on just the right level. Ultimately, once the identity validation is performed to eIDAS high, with the credential already being a QSCD and the organization being a QTSP, all interaction can be performed digitally, even contract signing.

Identity Deduplication

Once a qualified person identification process is in place, a new or existing user is always mapped to the same authenticity. Re-establishing history, contracts and deduplicating a person across products or departments (and organizations if legally permitted in light of privacy laws, such as the GDPR).

Biometrics

Under the banner of Presentation Attack Detection (PAD), a concerted effort is being made to mitigate the effects of biometric data leaks and make Biometric Recognition more robust against failure modes as a result of these leaks. This is important, as increasingly it is becoming easier to acquire, distribute, and sell biometric data (e.g. high resolution iris scans) for malicious purposes through, respectively, the growing biometric databases, the internet's increasing network bandwidth and storage capacity, and ever-more efficient online dark markets.

All biometric applications are inherently linked; they can only "tap" from a limited, shared, resource pool. The number of e.g. irises a person can genuinely present to a sensor is restricted. This results in a weakest link problem, where, without counter measures, individual biometric applications can only offer security guarantees as strong as the weakest out of all linked applications.

PAD methods attempt to harden individual applications against the failure modes of other applications. For example, by testing for the existence of a pupil reflex [1] a print of an (illegitimately retrieved) iris scan could be detected. This type of PAD is specifically known as Liveness Detection, as defined in ISO-30107-1 [2].

Presentation Attack Detection and Biometric Recognition

Presentation Attack Detection (PAD) is about the prevention of illegitimate use of a biometric system. Biometric Recognition (BR) concerns itself with the automation of matching (or explicitly not matching) instances of recorded biometric characteristics. PAD and BR concern themselves with different, but complementary, parts of a biometric system. Similarities are found when describing modes of operation of both PAD and BR, as we shall see below.

Modes of Operation

In PAD, there are roughly 2 modes of operation. One is to detect specific features of a biometric presentation that are known to be hard to replicate in certain attack scenarios. This can be the way light reflectance changes, or how certain marks move through 3-D space [3], as a user moves their head. Another mode is to try to detect features of known attack scenarios. This can e.g. be detecting the idiosyncratic light reflectance from 3-D face masks. In terms of ISO-301071 [2], the former can be done through e.g. Liveness Detection and Video Surveillance, whereas the latter can be anything from Artefact Detection, Alteration Detection to Coercion Detection and Obscuration Detection.

Applications that make use of Biometric Recognition capture a sample from some biometric source and then process this sample in one of three comparison modes. Mode one is 1:1 comparison, where the biometric sample is compared to only one other claimed identity, which can be in the form of some previously stored template. This comparison mode is also known as verification and is used in biometric authentication to check whether a person is who they claim to be. The second mode is a 1:n closed-set comparison, where a probe is compared to a biometric reference/samples database, to see whether there is a match to one of said samples. This is the mode often employed in identification, to find out the identity of the person being presented to the system. The third mode is 1:n+1, or open-set, comparison mode. This mode is used for deduplication, where one needs to find out if a person is in some database (and who it is), or if that person is unknown, so that no person is enrolled into the deduplicated database twice.

In both PAD and BR, we can say the general mode of operation is establishing authenticity. This is, respectively, the authenticity of the Modality in PAD, and of the Identity in BR. So, the first mode described for PAD maps neatly onto BR's verification mode. The identification mode of BR maps on to the attempts at specifically detecting what type of fake is being used.

Challenge-Response Protocols

Challenge-Response Protocols find their application in a wide range of fields in as many forms as there are fields, but can be defined as the family of protocols that allow one party A to present a Challenge (the "question") to which a party B must Respond (the "answer"), such that the authenticity of party B's claim can be established by party A. More extensive Challenge-Response Protocols might allow party B to challenge party A in a similar manner, such that mutual authenticity can be established. Examples of Challenge-Response Protocols in fields outside of biometrics are Digital Signature Algorithms and Viva Voce (oral) exams. In Digital Signature Algorithms, document-specific digests are processed into digital signatures so that the authenticity of said document can be tested. In Viva Voce exams, domain-specific questions are processed into relevant answers to test whether a student truly possesses some corpus of knowledge.

Process Asymmetry

Challenge-Response Protocols rely fundamentally on an asymmetry in the process that transforms the challenge into a response. It should be easy to verify that a certain response belongs to a specific process, but very hard to generate responses without controlling said process. The space of possible questions in an oral exam would make it very unlikely that one would be able to guess the correct answer to each question, and learning every possible answer by heart would be very difficult without gaining some deeper underlying understanding (and thus passing the exam). In certain Digital Signature Algorithms, if no algorithmic and implementation flaws are found, guessing (or brute-forcing) a correct signature would take far longer than the time we have until the heat death of the universe. Similarly, to beat Challenge-Response Protocols in biometrics, a simple photograph of a face will no longer work if the biometric system checks for specific changes in light reflectance when a person is challenged to move their head.

Biometric Challenge-Response Protocols

In Biometric Challenge-Response Protocols, the physiology or behaviour of a user can be challenged to respond in a specific way in order to establish liveness of the presentation. For example, we expect pupil dilation as we shine a light in the user's eye; we expect changes to the skin's light reflectance when we ask a user to look in a different direction. We explicitly name this type Biometric Challenge Response Protocols, as the source of the Response is a biometric source. Many other types of Challenge-Response Protocols exist, some are also implemented in Biometric Systems as measures to protect the security and integrity of components of the system. These generally do not require involvement of the Biometric Source as a "processor".

In a way, the link between the Sensor and a specific Biometric Source constitutes a communication channel, across which information related to the authenticity of the source is transferred. A successful Presentation Attack is a compromise of the integrity of this channel. Biometric Challenge-Response Protocols allow the introduction of a freshness component to the presentation of a biometric characteristic, thus promising mitigation of presentation attack threats at the Source.

There are 5 categories that in our eyes allow for a clear and concise description of the Biometric Challenge-Response Protocol. These dimensions are Population to Single Subject, Physiological to Behavioural, Covert to Overt, Controlled to Automated, and Unpracticed to Practiced.

Model, Population to Single Subject

Models (as defined in the formalization section) are used to verify whether the given Response matches the Challenge. Said models can be based on a characteristic a population possesses, e.g. pupil response to luminance level changes, or characteristics that smaller groups (down to an individual) possess, e.g. how a person's gait changes while stepping on an elevated surface.

The specificity of the model is closely related to whether the Challenge Response Protocol is usable for Recognition or PAD. Although all Biometric Challenge-Response Protocols prove liveness of the presentation to a degree, a positive verification by a single subject model contains more identity information about the person than a population wide model would. In practice however, population wide models will be easier to build than single subject models, as single subject models need to be "trained" on the specific subject, thus making the enrollment phase more complex.

Response Type, Physiological to Behavioural

Responses given as part of a presentation can broadly be classified as physiological responses, e.g. changes in skin conductance such as in [4], or behavioural, e.g. reflexive gaze changes in response to rapidly shifting stimuli [5].

Noticeability, Covert to Overt

Challenges can vary in degree in which they are noticeable by a person. This can range from fully covert, e.g. ultrasonic sounds causing fine vibrations in the lips while speaking, partially covert, e.g. determining ear canal structure by playing sounds into a person's ear, or very overt, e.g. in the patterns drawn with a finger on a smartphone.

Noticeability of a Challenge can have a big impact on User Experience (UX). On the one hand, covert methods allow for smooth User Interfaces (UIs) that do not ask too much of the user, on the other hand, mostly overt methods might have better UX as the user sees and feels more of the Challenge-Response Protocol's security implications.

Process, Controlled to Automated

Challenges can also vary in degree of conscious control someone has over starting and/or halting processing the challenge in the scope of the biometric system. Users can have full control over the response, e.g. speaking a challenge word, or the response can be mostly automated and/or reflexive, e.g. pupil dilation changes in response to certain stimuli. Further, control can be given, even over automated/reflexive actions, by informing the user that a response is expected and can be denied in some way. In this case, even the "processing" of covert challenges such as ultrasonic sounds can be controlled by covering the lips or turning the head away. The other way around, controlled process can become automated if a person practices them enough. For example, the meaning of a word interfering with the task of speedily naming the colour of that word, e.g. green. This effect is known as the Stroop effect and is one of the most robust findings in experimental psychology. It works because it is near impossible to turn off the ability of reading and interpreting words.

Skill Required, Unpracticed to Practiced

The ability to respond to a given challenge can be "unpracticed", without practice prior to use of the biometric application. An example is to have subjects place on a vibrating plate that measures the change in vibration due to the hand-placement. Other times the security of the challenge-response protocol relies strongly on the user having had some form of practice during initial phases of application use. In patterns in pupil dilation are used for verification that are due to presentation of a sequence of novel and non-novel pictures. It is possible to determine (on-)novelty, because users were presented with a sufficiently individualized selection of pictures during an enrolment phase. These would be considered "practiced" abilities.

Authentication

Strong authentication methods are a must online if you want to do anything of consequence. They might consist of one, or several authentication factors blended together. The latter is known as Multi-Factor Authentication (MFA). Factors can either be things you know, e.g. passwords, have, e.g. smartcards, or are, biometrics e.g. fingerprints. We call this the 3 Factors of Authentication model (3FA-model). I believe this model is incomplete and due for a refactoring.

The game of authentication consists of proving your claim of identity, your claim of who you are. If we take the slogan at face value, this is easy. Simply prove who you are by who you are. We do not even need the other two types of factors!

Unfortunately, "are"-factors are not quite what they claim to be.

"Are"-factors are more accurately described as "inherence"-factors. I am not my fingerprint, but maybe my fingerprint is inherent to me. The issue is that "something you know, have or that is inherent to you" loses out on some of the catchiness of the original. Like if Donald Duck's nephews were called Hewey, Dewey and Peter.

More importantly, "are"-factors enjoy an undue status boost from this simplified view of authentication. We are well aware that passwords and smartcards have their issues, but biometrics have equally big problems. Only through a smart synthesis of all types of factors can we build strong MFA solutions.

Further, an unofficial factor category known as "things you do" has been gaining prominence. Credit card processing companies detect fraud by checking, e.g., where and when a transaction happened. Recently, many websites have started doing the same, escalating to an e-mail verification whenever a user logs in from a new browser instance.

I would also include in this category the way you touch, tap and swipe on your smartphone and other similar touch/keystroke dynamics.

In the 3FA-model do-factors fall in a weird place between being something you are and know, as they on depend on the length of your fingers, but also on how well you have learned to use your mobile phone. This type of knowledge is also known as procedural knowledge.

In short, we desire a model where 1) intuitively no single factor is above other factors and 2) "things you do" are nicely integrated and turned into an official factor. Here we present the 2 Dimensions of Authentication model (2DA-model) that does exactly this. “Are”-factors are better explained as “Have”-factors, in my view. I am not my fingerprint, but I do have one (or 10). The first dimension is therefore that what you know vs what you have, knowledge vs possession. This passes the intuition litmus-test as well: “I have a fingerprint” and “I have a smartcard” vs “I know my password” as well as “I know where I am” and “I know the way I use my smartphone”.

The second dimension, transferability, naturally follows. The most obvious distinction you can make between having a fingerprint and having a smartcard, and knowing a password and knowing a way of using a phone, is that my fingerprint and way of phone use are not easily transferable.

Each quadrant in this model describes a new set of factors. It distinguishes between things you carry, e.g. smartcards, show, e.g. fingerprints, do, e.g. swipes on phones, and tell, e.g. passwords to your computer.

This can be a first step in the introduction of the 2DA-model that, I hope I have made clear, fixes some issues with the 3FA-model in an intuitive way.

Problem with State of the Art

Currently the credential issued to a person, for instance a phone and PIN, which can be transferred Biometric capture is delegate to a sensor, which can be configured with a biometric from a different person thus authenticating the wrong person when using a biometric match.

Biometric recognition uses static biometric data this means presentation attacks can be performed dynamic behavior biometric matches a person to an activity, whilst the biometric model, matches if the activity is performed by the right person while possibly establishing lifelessness trough presenting different task, e.g. The name of the recipient.

According to an aspect of the invention it is noted that behavioural biometrics is a somewhat mature field, however academic literature and probably patent literature mostly looks at stuff that is related to physiological features of behaviour.

There are regularities to (motor) (sequence) learning which we can exploit to create strong behavioural biometrics. From this we can, at least, combine different activities.

1. Training Schedules, Ranking Estimation

In a practical behavioural biometric system, performance as a function of time spent practicing converges after a reasonably long time. Hence recognition performance deteriorates quite rapidly if this time spent practicing is not long enough. This deterioration is, however, not equal to all people, and we can construct training schemes that are based on this differential performance deterioration, to minimize the amount of time an individual needs to practice, or even make the convergence of recognition performance (behavioural stability) happen quicker. A behavioural biometric system often consists of an enrollment phase and a testing phase. We suggest adding a training phase prior to the enrollment phase, and basing the schedule of the enrollment phase on a ranking shown in individual behavior in the training phase. One measure of ranking could be behavioural variance shown (as this may eventually lead to behavioural stability).

Additionally, it is known that age and other qualities also have a wide ranging influence on the development of behavioural stability, so we can base the enrollment schedule off these “soft” biometrics as well.

2. Cognitive Biometrics

Discrete and continuous motor sequences that are performed for a behavioural biometric system/task are represented in a finite amount of ways, based on the ways in which these tasks can be deconstructed into its composing parts (motor chunks). Behaviour or the way the tasks are performed are a result of physiological characteristics, some unknown factors, and also the state of representation. Based on a small, but varied, sample of people it is possible to estimate how people progress through these different representations as a function of the task, as well as estimate the specific progress that people have made, using for example Hidden Markov Models. Following this initial estimation phase, we can start estimating likelihoods of progressing from one stage to the next (or staying in specific states for a given amount of time). Progressing through representation states generally only happens through practice, which makes it harder to impersonate people (and thus take more time).

3. Challenge Response

More individual information can be had from challenging the user on a behaviour, or specific way of performing a task, after enough practice. Such challenges are often used in cognitive psychology to test whether someone is an expert at a specific skill. An example is the stroop task, in which a coloured word is repeatedly presented to a participant and the participant is required to name the colour of the word. In neutral associations of the word with the colour, reaction time is not influenced (colour blue: word ‘house’), but in congruent associations between the colour and word reaction time is much faster (colour blue, word ‘blue’, whereas in incongruent associations the reaction time is much slower (colour blue: word ‘red’). To a non-speaker of English, however, these associations between words and colour do not exist, and thus they show no such effect. In the context of a behavioural biometric task, a similar task can be built that allows for these challenges to happen. Both for genuine tests (is it really him), and impostor tests (is it really not him). For example, change the colour of the one of the buttons, or feedback UI items. This may generate surprise and potentially slow down a person, but someone new to the task may not be surprised in the same way. This too may work especially well in combination with 4.

4. Individualisation of Task

Performance of a recognition system is always a function of intra-class and inter-class variance, in other words within-subject and between-subject. The lower the intra-class variance, and the higher the inter-class variance, the more easily “classes” (subjects) can be separated from each other, and the better a recognition system works. In normal biometrics, one cannot really change the inter-class variance, as this would require early genetic manipulation. However, behaviour can be easily manipulated to be more and more different from other people, by simply randomly varying the task that an individual is asked to perform. Very overt examples include scrambling the order in which the numbers on a PIN pad are given to people, or even varying the authentication game they play, covert examples include the colours and timing of the feedback in UI elements, the size, the location, the type of feedback (phone vibration/buzzing).

5. Generation of Synthetic Behavioural Data

Based on 2, not only can we build a model that allows us to track progress of a user’s cognitive representation of a motor sequence, but we can also inverse the model and start generating examples of data that takes into account change in practice. Because gathering real world data is quite expensive (one needs to have people do your task repeatedly), synthetic data is very nice to have to allow you to train classifier on ever more data. Similarly, we can use this data as an adversary to our system, to create classifiers that are better at detecting non-human impostors as well.

Skills and Subliminal Interference

Trained skills are unique to persons and to the devise employed. The way a partiture is played on a violin depends on the person playing the violin and on the violin used. A skilled person can discern when listening to a specific performance which artist and even which violin is used. If the trained skill is amiable to disruption, for instance Maradona playing football, the other players in the field will distrust the performance, but this distribution enable exception of more unique characteristics of the artist enabling even price identification and authentication of the performer.

When humans are presented with changes in their environment they can detect slight variation subliminal and intuitively without consistently being aware of a difference. For instance a human can discern 10 ms resolution timing difference in its reaction to a stimulus, but would not be able to consciously detect difference between a 10 ms and a 30 ms stimulus, but subliminally will detect it and act differently.

In the present application, a novel application of Challenge-response is described in biometrics, gaining Presentation Attack Detection and Biometric Recognition and liveliness whiles preventing by employing a specific factor in authentication something are, namely some you can do uniquely.

According to an aspect of the invention, a method as shown in FIG. 1 and defined in claim 1 is provided.

A user uses a device or authentication device, such as a mobile phone, wearable of insertable, to perform a challenge or I/O response to an I/O request when instructed. The method includes a step of verifying whether the received I/O response has been received from a user associated with the authentication device after the I/O request has been output on the authentication device and whether the received I/O response relates to the I/O request. Specifically, it is verified whether the I/O response results from a life interaction with the authentication device, in particular a user interaction with the I/O request such as an interaction with a sequence of request signals such as a moving button image on a display of the authentication device, or another shift of a pattern, e.g. in location, time, frequency, colour or other I/O interface parameter. The I/O response or challenge is trained specifically for the users, on a device and environment precisely controlled and unique for the user. The user being asked to perform the challenge but the challenge includes a trained part and a dynamic unique part to this challenge event.

The trained part is a result of repeatedly offering the I/O request, while the dynamic unique part results from also offering, after the training process, a slightly deviating aspect in the I/O request, deviating from the I/O request offered earlier, during a training process.

The dynamic unique part induces a response on the trained part resulting in a unique performance by the user.

The I/O request may include presenting a sequence of request signals on the I/O interface of the authentication device, such as a mobile or other communication device. The request signals may include audible, optical and/or tactile patterns. Also, the I/O response may include audible, optical and/or tactile patterns.

Preferably, the verification step includes determining a dynamic response behavior in the received I/O response. The dynamic response behavior may dynamically relate to the presented sequence of request signals. Further, the verification step may include analyzing the dynamic response behavior in terms of time moment, time duration and/or spatial characteristics.

In one embodiment, the user is challenged or asked to perform a single press on a screen, as a I/O response to a I/O request. The environment is in such a way that a red button is displayed and a blue flashing countdown is present. The user is trained to press the button when the counter turn 0 and blue by repeatedly sending the same I/O request so as to develop a unique I/O response. The red button show a button down animation and the user is presented with haptic feedback on touch.

The trained part of the challenge is a specific location if the button and timing in countdown, and duration of the animation and haptic feedback. The unique part of the challenge or I/O response is changing the timing in countdown, and duration of the animation and haptic feedback. On training the user presses the button. By offering a constant and a unique part or during training a model is constructed by measuring the user's performance. Here, a subsequent I/O request deviates in an aspect from earlier I/O requests, e.g. in terms of layout, colour and/or dimensions.

By offering the user a challenge and comparing the user performance against the model biometrics recognition is achieved using behavioral biometrics, by making the challenge unique trough disturbing the performance by unexpected unique changes and measuring and comparing performance against the model liveliness and presentation attack detection is achieved.

In another embodiment, a user is asked to choose and confirm a pin. In this embodiment the size of the key numbers is varied and in UI elements, the size, the location, the type of feedback (phone vibration/buzzing).

It will be understood that the above described embodiments of the invention are exemplary only and that other embodiments are possible without departing from the scope of the present invention. It will be understood that many variants are possible.

Such variants will be apparent for the person skilled in the art and are considered to fall within the scope of the invention as defined in the following claims.

The invention claimed is:

1. A method for performing a remote online authentication process, comprising the steps of:

providing an authentication device communicately connected to an interrogating entity;

sending, by the interrogating entity, an I/O request to the authentication device;

outputting the I/O request on the authentication device, via an I/O interface of the authentication device;

receiving, on the authentication device, an I/O response, via the I/O interface of the authentication device, and verifying whether the received I/O response has been received from a user associated with the authentication device after the I/O request has been output on the authentication device and whether the received I/O response relates to the I/O request.

2. The method according to claim 1, wherein the verification step includes checking whether the received I/O response results from a life interaction of the associated user with the authentication device.

3. The method according to claim 1, wherein the step of outputting the I/O request on the authentication device includes presenting a sequence of request signals on the I/O interface.

4. The method according to claim 3, wherein the step of receiving the I/O response on the authentication device includes a user interaction with the presented sequence of request signals.

5. The method according to claim 3, wherein the sequence of request signals include audible, optical and/or tactile patterns.

6. The method according to claim 3, wherein the sequence of request signals include a shift of a pattern.

7. The method according to claim 1, wherein the verification step includes determining a dynamic response behavior in the received I/O response.

8. The method according to claim 7, wherein the dynamic response behavior in the received I/O response dynamically relates to the presented sequence of request signals.

9. The method according to claim 1, wherein the received I/O response includes audible, optical and/or tactile patterns.

10. The method according to claim 1, wherein the verification step includes analyzing a dynamic response behavior in the received I/O response in terms of time moment, time duration and/or spatial characteristics.

11. The method according to claim 1, wherein the verification step is performed using historic data received from the associated user.

12. The method according to claim 4, including a step of generating historic data using data from user interactions with presented request signals.

13. The method according to claim 1, comprising repeatedly sending the same I/O requests to the authentication device for training the user associated with the authentication device to develop a unique I/O response.

14. The method according to claim 1, wherein a subsequent I/O request deviates in an aspect from earlier I/O requests, in particular in terms of layout, colour and/or dimensions.

15. The method according to claim 11, wherein the historic data are stored in a secure element.

16. The method according to claim 1, wherein results of the verification step are used for authorizing the user associated with the authentication device to interact with a platform application.

17. A computer program product for performing a remote online authentication process, the computer program product comprising computer readable code for facilitating a processing unit to perform the steps of:

providing an authentication device communicately connected to an interrogating entity;

sending, by the interrogating entity, an I/O request to the authentication device;

outputting the I/O request on the authentication device, via an I/O interface of the authentication device;

receiving, on the authentication device, an I/O response, via the I/O interface of the authentication device, and verifying whether the received I/O response has been received from a user associated with the authentication device after the I/O request has been output on the authentication device and whether the received I/O response relates to the I/O request.

* * * * *